April 28, 1953 M. J. WILSON 2,636,198
PORTABLE BRUSHING MACHINE FOR WASHING VEHICLES
Filed April 12, 1950 7 Sheets-Sheet 1

INVENTOR:
MARVIN J. WILSON
BY
ATT'YS

April 28, 1953  M. J. WILSON  2,636,198
PORTABLE BRUSHING MACHINE FOR WASHING VEHICLES
Filed April 12, 1950  7 Sheets-Sheet 2

FIG. 2

INVENTOR:
MARVIN J. WILSON
BY
ATT'YS

April 28, 1953 M. J. WILSON 2,636,198
PORTABLE BRUSHING MACHINE FOR WASHING VEHICLES
Filed April 12, 1950 7 Sheets-Sheet 3

FIG. 3

INVENTOR:
MARVIN J. WILSON
BY
ATT'YS

April 28, 1953  M. J. WILSON  2,636,198
PORTABLE BRUSHING MACHINE FOR WASHING VEHICLES
Filed April 12, 1950  7 Sheets-Sheet 5

INVENTOR:
MARVIN J. WILSON
BY
ATT'YS

April 28, 1953 M. J. WILSON 2,636,198
PORTABLE BRUSHING MACHINE FOR WASHING VEHICLES
Filed April 12, 1950 7 Sheets-Sheet 6

FIG. 7

INVENTOR:
MARVIN J. WILSON

April 28, 1953 M. J. WILSON 2,636,198
PORTABLE BRUSHING MACHINE FOR WASHING VEHICLES
Filed April 12, 1950 7 Sheets-Sheet 7

*INVENTOR:*
MARVIN J. WILSON
BY
ATT'YS

UNITED STATES PATENT OFFICE 2,636,198

PORTABLE BRUSHING MACHINE FOR WASHING VEHICLES

Marvin J. Wilson, Chicago, Ill.

Application April 12, 1950, Serial No. 155,530

8 Claims. (Cl. 15—21)

This invention relates to mobile vehicle-washing machines, more particularly mobile vehicle-washing machines for use in cleaning motor vehicles, especially trucks.

Various kinds of washing machines have been provided heretofore for use with railroad cars. Railroad cars being confined to travel on rails, washing machines for this type of washing have been constructed for movement on rails also, or on platforms alongside the car to be washed. These machines, accordingly, have been limited to washing only the opposite sides of the car. Moreover, none of these prior constructions would be suitable for use in washing the modern motor vehicle with their varying heights, sizes, and contours.

The main objects of this invention, therefore, are to provide an improved form of mobile washing machine especially for use in washing motor vehicles; to provide an improved form and mounting of a brush and associated water spray to secure the most effective results in a quick and thorough washing of motor vehicles; to provide an improved form and arrangement of power means for rotating the brush and shifting it and the spray vertically and horizontally with respect to the vehicle to be washed; to provide improved means for controlling the operation of said power means whereby the delivery of water to the spray is controlled by the horizontal disposition of the brush for effecting the washing operation; to provide an improved vehicle-washing machine of this kind which is adapted to be mounted on a conventional type motor lift-truck, whereby the washing machine is facilely movable to, around, and vertically of the vehicle to be washed, thereby accommodating the disposition of the brush to the character of the vehicle to be washed; and to provide an improved vehicle-washing machine of this kind the various parts of which are of simple construction and easily assembled, thereby making manufacture economical and the use efficient.

In the particular embodiment shown in the accompanying drawings:

Figure 1 is a side elevational view of an improved vehicle-washing machine constructed in accordance with this invention, mounted on a conventional type motor lift-truck.

Fig. 4 is an enlarged detail view taken on the line 4—4 of Fig. 3, showing the oil-operated piston for effecting the shifting of the brush and spray means horizontally of the vehicle.

Fig. 5 is a plan view of the same, the line 4—4 indicating the plane from which Fig. 4 is viewed.

An improved vehicle-washing machine embodying this invention, comprises a water supply tank 15 on which is mounted a brush and spray means 16, rotated and horizontally shifted by the respective fluid motors 17 and 18, empowered by a fluid pump 19 as controlled by a master valve 20, and to which brush and water spray means 16, water is supplied from the tank 15 by a water pump 21. The fluid pump 19 and the water pump 21 are driven by an engine 22, all of which, together with an oil reservoir 23 are mounted on the water supply tank 15, which in turn is adapted to be supported on an elevatable platform 24 of a conventional type motor lift-truck 25.

The water-storage tank 15, as herein shown, is a sheet metal rectangular construction. It is formed with feet 26 whereby it normally rests on the floor with the bottom of the tank spaced therefrom sufficiently to permit the platform 24 of the motor lift-truck 25 to be inserted thereunder for the purpose of placing the tank and the aforesaid mechanism thereon to permit their transport to and from and about the vehicle which is to be washed. On the top of the tank are secured various plates and bars for supporting the hereinbefore noted parts of the washing machine, the details of which plates and bars will be more fully set forth hereinafter. At one side the tank is equipped with a filler spout and cap 27. On the inside is arranged a suction pipe 28 for the water pump 21.

The brush and spray mechanism 16 comprises a brush 29 journaled on a yoke 30 hinged to a reciprocating bar 31 and mounting a water guard 32 on which is supported the spray pipes 33.

Figure 2:
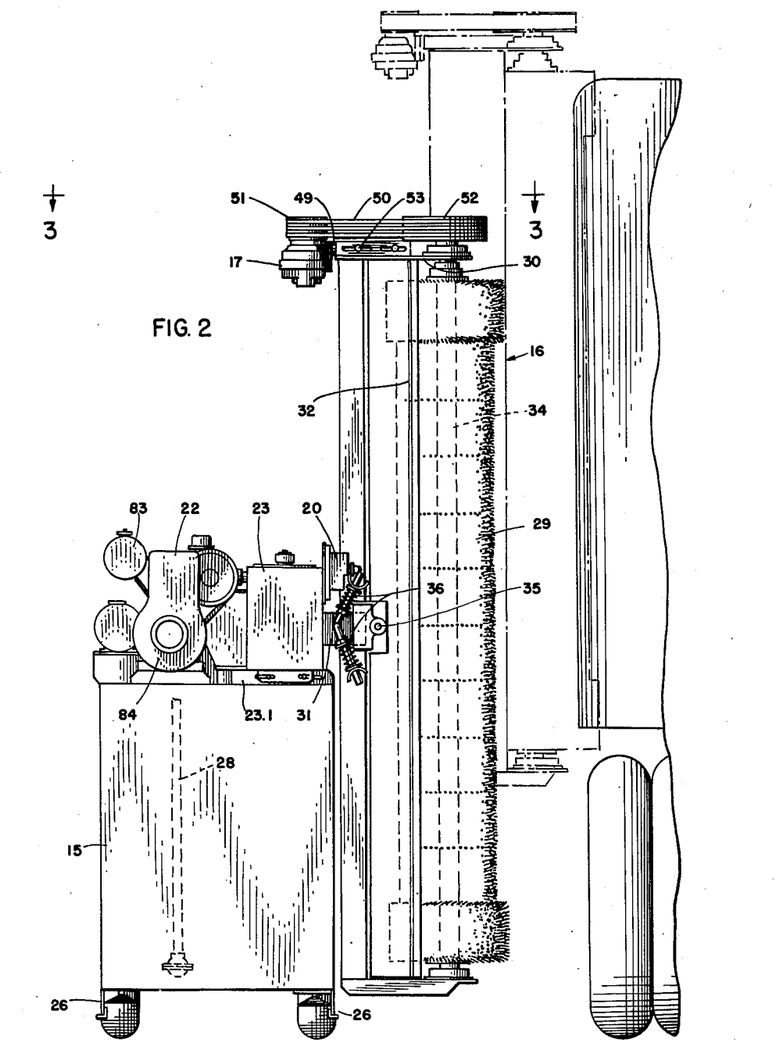
Fig. 2 is a similar view taken from the right of Fig. 1, on the plane of the line 2—2, showing in full and dotted outlines the brush in its retracted and extended positions with respect to the side of a vehicle to be washed.

The brush 29 is preferably a sectionally-formed cylindrical arrangement secured to a shaft 34. The shaft 34 is journaled between and on the ends of the yoke 30. The upper and lower sections of the brush are somewhat larger in diameter than the intermediate sections, as most clearly shown in Fig. 2, so as to facilitate better washing of the top and bottom borders of the vehicle.

Figure 6:
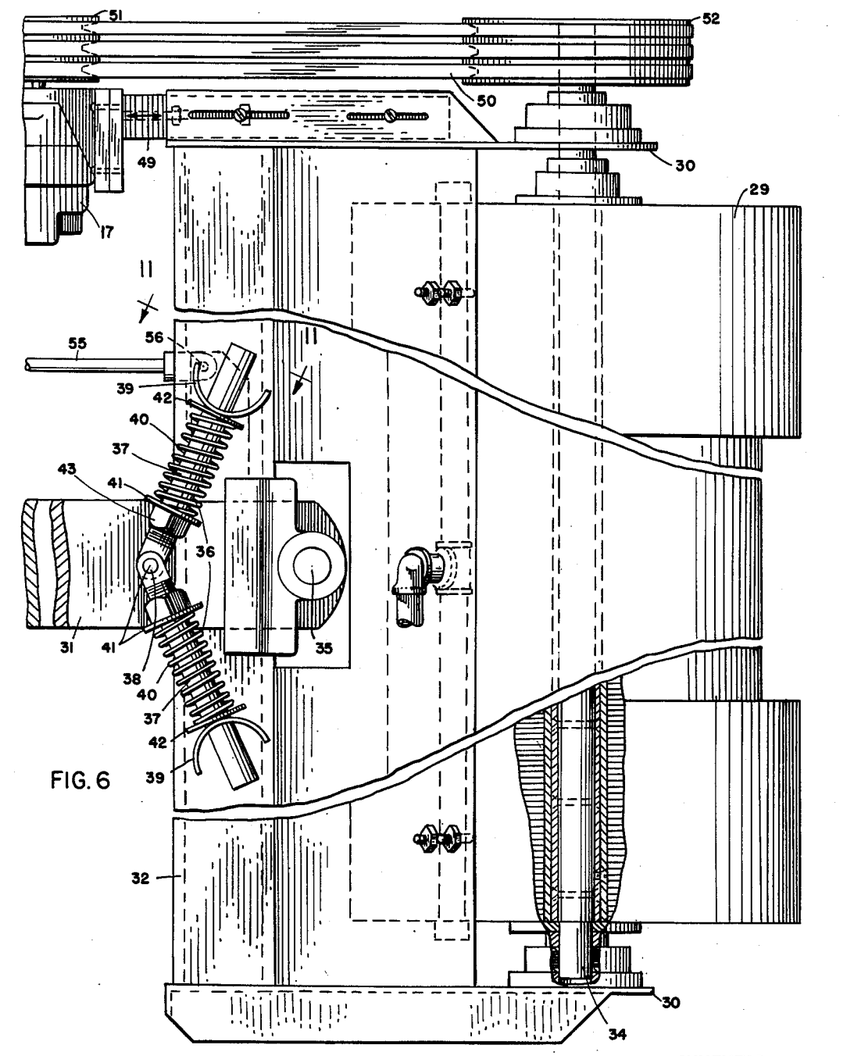
Fig. 6 is a much enlarged and fragmented side elevation of the brush and its supporting and driving mechanism as viewed from the plane of the line 6—6 of Fig. 3.

The yoke 30 is an elongate U-shaped member hinged at 35, intermediate the ends of the long transverse base part, to the bar 31 so that the yoke 30 may tilt in a vertical plane to better accommodate the brush 29 to the contour of the exterior of the truck to be washed. However, the yoke holds the brush 29 in its normal, vertically-disposed position by pairs of equalizers 36 (see Figs. 2 and 6). These equalizers 36 are arranged on each side of the bar 31 and comprise pins 37 hinged at 38 to the bar 31 and slidably extending through crescent-shaped brackets 39 secured to the water guard 32. Springs 40, embracing the pins 37 between washers 41 and 42 respectively bearing against nuts 43 and brackets 39, counteract each other to position the brush in its normal vertically disposed position. The nuts 43 are adjustable so as to alter the tension of the springs 40 for each pair of equalizers 36, as experience may indicate the necessity therefor.

Figure 8:
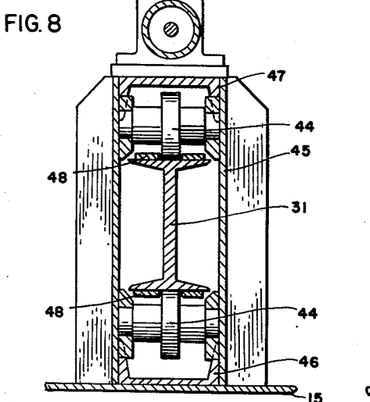
Fig. 8 is an enlarged, sectional detail of the horizontally shiftable support for the brush, taken on the line 8—8 of Fig. 5.
Figure 9:
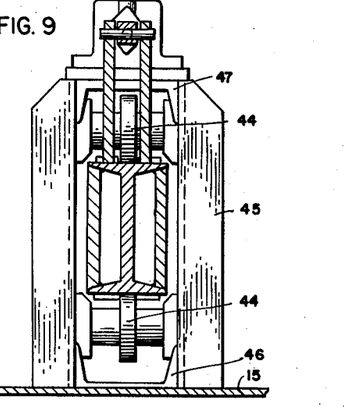
Fig. 9 is a similar view taken on the line 9—9 of Fig. 5.
Figure 10:
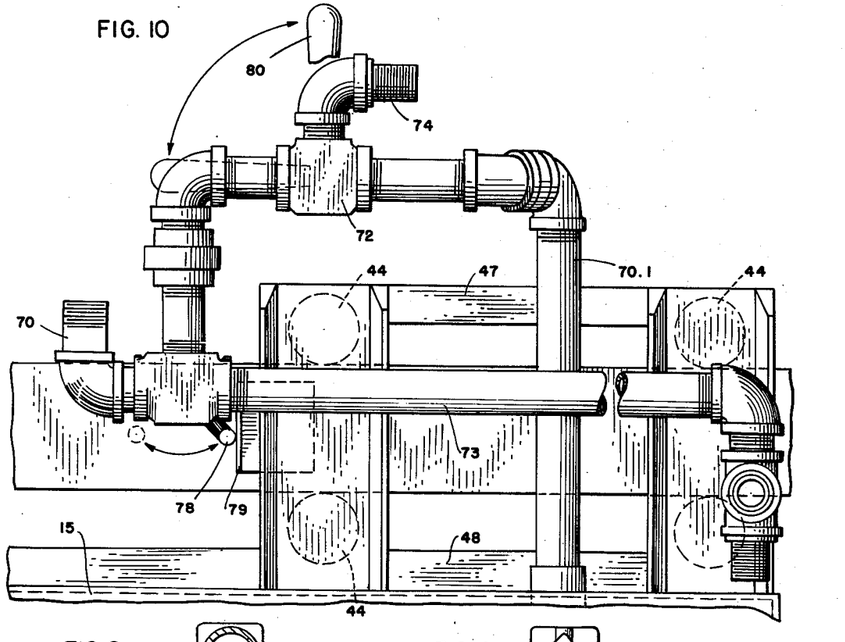
Fig. 10 is an enlarged, partial side elevation of the water conduits and the valve controls therefor, as viewed from the plane of the line 10—10 of Fig. 3.
Figure 11:
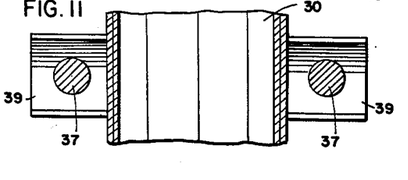
Fig. 11 is an enlarged, fragmentary detail taken on the line 11—11 of Fig. 6, and Figs. 12 and 13 are fragmentary, cross-sectional, and vertical elevational views of the brush and shield showing the arrangement of the spray nozzles on the water supply pipes.

The bar 31 is most clearly shown in Figs. 8 and 9. Preferably it is in the form of an I beam and is supported on and between pairs of rollers 44 journaled on plates 45 secured to oppositely disposed channel bars 46 and 47. The channel bar 46 rests on the top of the tank 15 with the channel bar 47 spaced therefrom by the plates 45. Rails 48 are secured to the opposite faces of the I bar 31 to keep the I bar properly positioned on the rollers 44 between the plates 45 during the reciprocation of the bar 31 for moving the brush toward and away from the vehicle to be washed.

Figures 1, 12, 13:
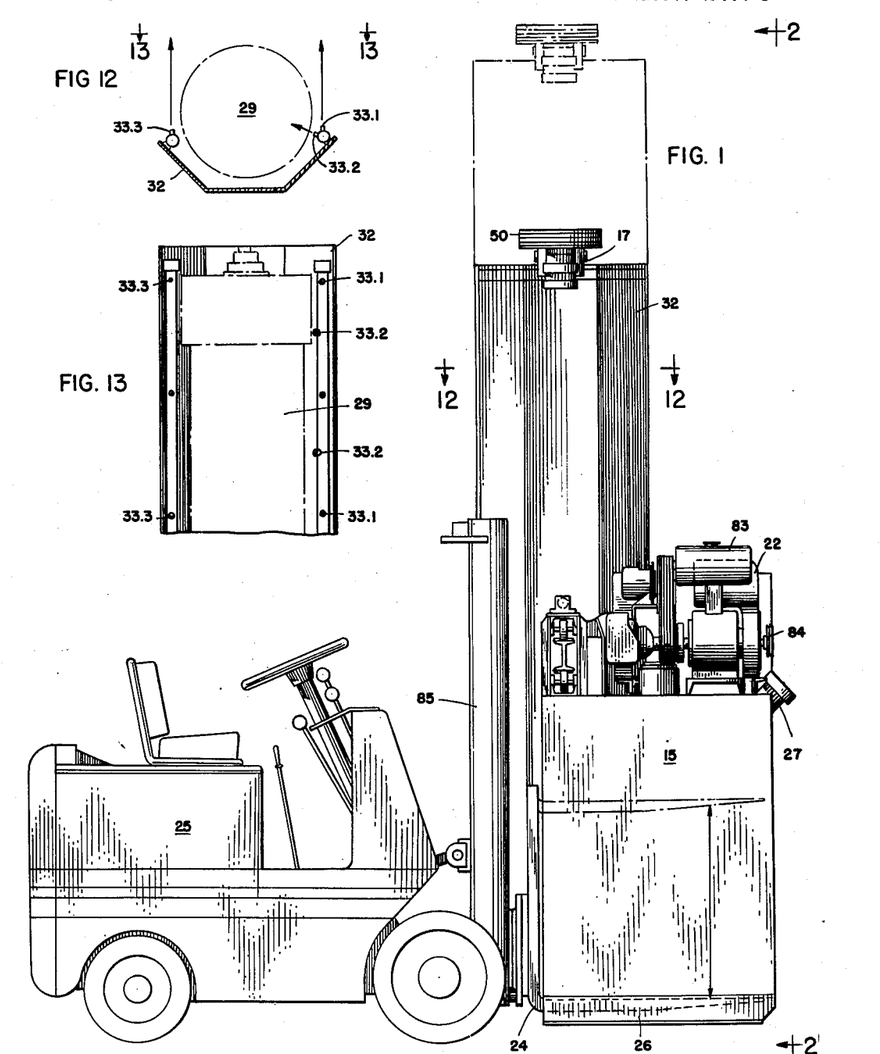

The water guard 32 is a sheet metal plate having angularly disposed wings. At its ends it is secured to the transverse arms of the U-shaped yoke 30. On the opposite wings of this water guard are mounted the spray pipes 33. As most clearly shown in Figs. 12 and 13, one pipe 33 has two series 33.1 and 33.2 of angularly disposed spray nozzles extending axially of that one pipe, whereas the other pipe 33 has a single series 33.3 of nozzles extending axially of said other pipe. As will be noted from these figures, the nozzle series 33.2 is disposed to direct a spray of water onto the brush 29 for keeping it flushed, whereas the other nozzle series 33.1 and 33.3 direct a spray of water normal to the vehicle being washed. The spray from the nozzle series 33.1 tends to "cut" the dirt on the vehicle in advance of the contact of the brush, whereas the spray from the nozzle series 33.3 serves to rinse the vehicle surface following the passage of the brush thereover.

The fluid motors 17 and 18 are conventional type devices, the former being a rotatable motor, the latter being a reciprocating motor.

Figure 3:
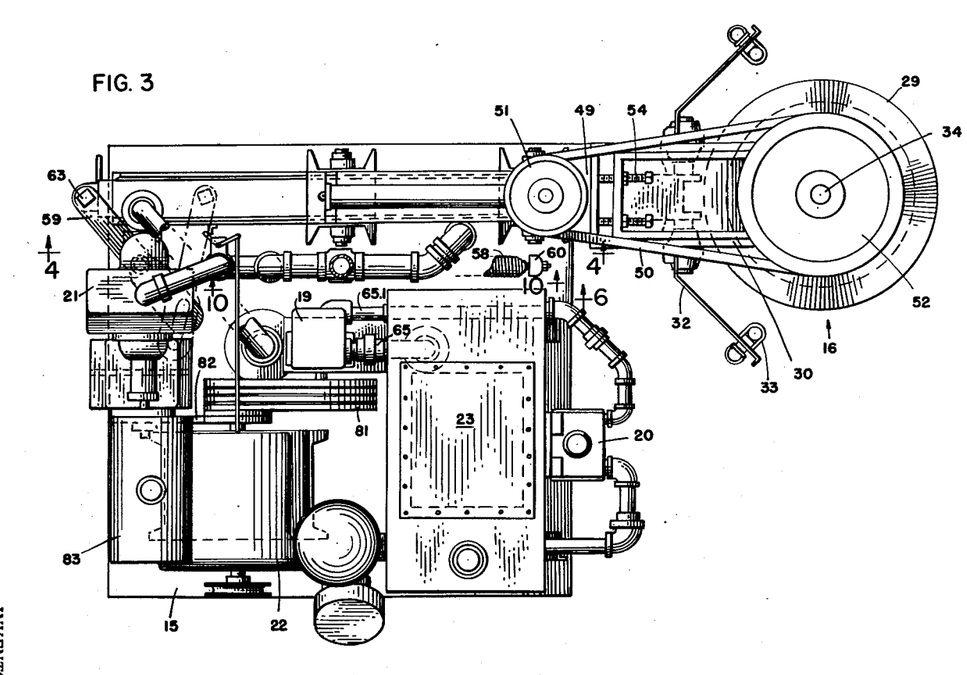
Fig. 3 is an enlarged, plan view of this improved vehicle washing machine.

The fluid motor 17 is mounted on a bracket 49 and connected by V-belts 50 and pulleys 51 and 52 to rotate the brush 29. The bracket 49 is slidably supported on the upper end of the yoke 30 by a bolt and slot connection 53 (see Fig. 2), and provided with adjusting screws 54 (see Fig. 3) to permit the slack in the belt 50 to be taken up so as to keep it properly tensioned for effective driving of the brush 29. The connection of the motor 17 with the oil pump 19 and master control valve 20 will be explained presently.

Figures 4, 5:
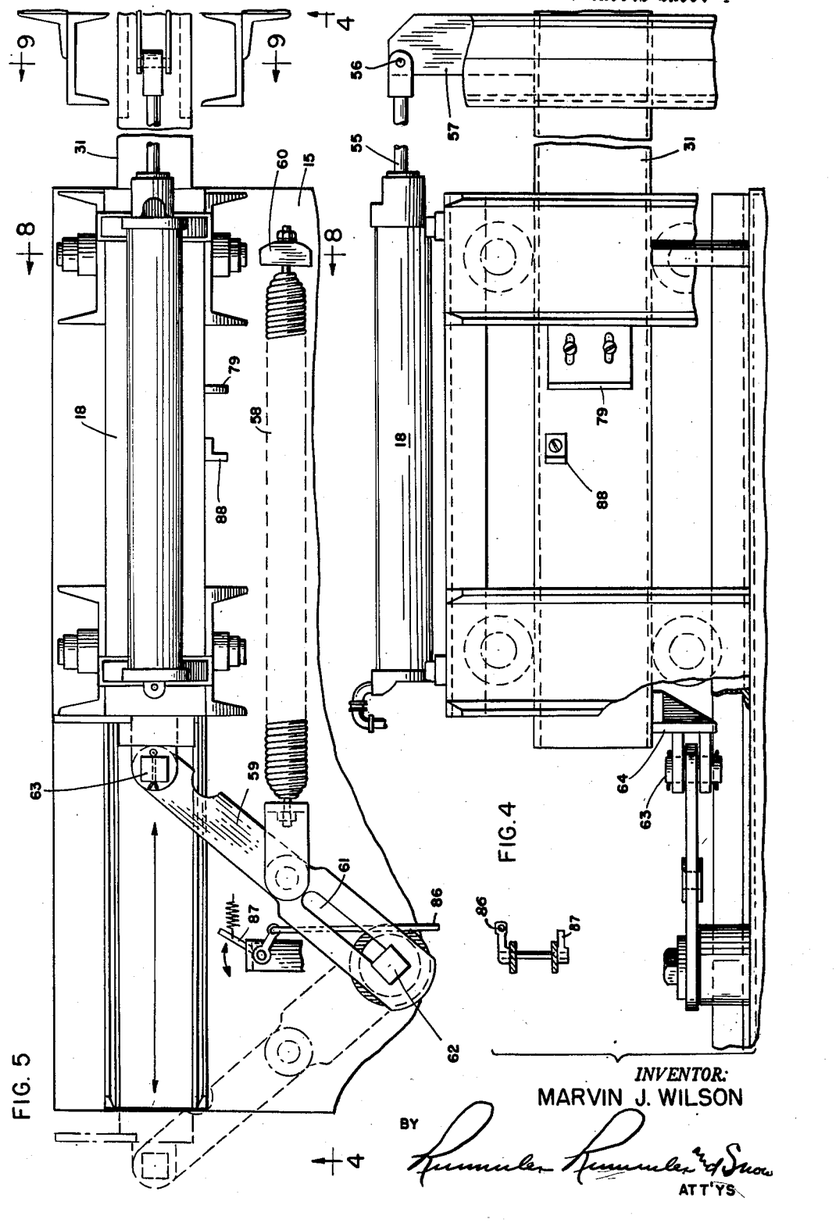

The fluid motor 18, which is most clearly shown in Figs. 4 and 5, is a cylinder-piston arrangement. The piston rod 55 is hingedly connected at 56 to a post 57 on the bar 31. The cylinder is connected to the oil pump 19 through the master valve 20 so that when oil is admitted thereto it retracts the piston against the action of a spring 58 and holds the bar 31 retracted so long as the valve 20 is allowed to remain in the shifted position, as will be explained more fully hereinafter.

The spring 58 acting on an arm 59 normally urges the bar 31 to position the brush and spray mechanism 16 in its most forward position with respect to the water storage tank 15, which is its normal vehicle washing position. The spring 58 is connected at one end to a bracket 60 on the top of the water storage tank 15 and at the other end through an opening 61 in the arm 59. The arm 59 is slidingly pivoted at 62 to the top of the water storage tank 15 and hingedly connected at 63 to a post 64, depending from the rear end of the bar 31 (see Fig. 4).

The oil pump 19 is also a standard device used for developing pressures for operating fluid motors. It is mounted on the top of the storage tank 15 adjacent to the oil reservoir 23 and connected by suitable pipes 65 and 65.1 to the reservoir and the master valve 20, respectively.

The master valve 20, like most of the rest of these mechanisms, is a standard valve used for controlling fluid pressures to motors of the type herein shown, one of which as before explained, is a rotary type, and the other is a reciprocating type. The master valve 20 is connected by pipes 66 to the fluid motor 17 and by a pipe 67 to the fluid motor 18.

Figure 7:
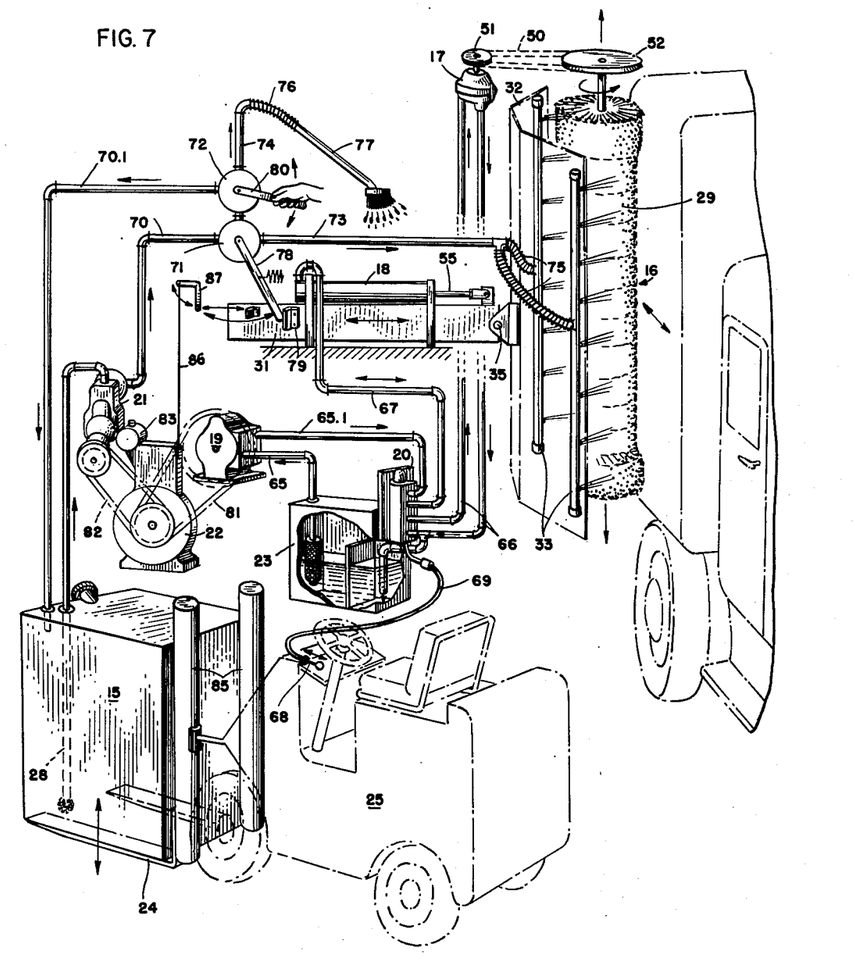
Fig. 7 is an exploded perspective of this embodiment of an improved vehicle-washing machine constructed in accordance with this invention.

The communication between these pipes is controlled by a sliding valve member so apertured that in one extreme position communication is open between the fluid pump 19 and the motor 17 and the reservoir 23 through pipes 66, and in the other extreme position communication is open between the fluid pump 19 and the motor 18 through the pipe 67. In its neutral position this shiftable valve member of the master valve 20 returns the oil pumped by the pump 19 to the reservoir and permits a release of the pressure on the cylinder-piston motor 18. A control handle 68 mounted on the dashboard of the motor lift-truck 25, is connected by a flexible shaft 69 to the aforesaid valve member of the master valve 20, as indicated in Fig. 7.

The water pump 21 is of standard construction and is mounted on a suitable reinforcing plate on the top of the water storage tank 15. Its inlet is connected to the suction pipe 28. Its outlet is connected to a pipe line 70, which leads to valves 71 and 72 controlling branch pipes 73 and 74, and returns from the valve 72 through a branch 70.1 to the storage tank 15. The branch 73 is connected by flexible conduits 75 to the spray pipes 33. The branch 74 may be connected by a flexible conduit 76 to a manually operated brush 77, as indicated in Fig. 7.

The valve 71 is a three-way valve and its operating handle 78 is spring actuated, so as to normally open communication from the water supply line 70 and the branch 73 leading to the sprays 33. The retraction of the bar 31 (on which the brush and spray mechanism 16 is mounted) brings a stop 79 into engagement with the handle 78 and shifts it to an opposite position for directing the flow of water from the pump 21 back to the tank 15. The operating handle 80 for the valve 72 is manually controlled.

The engine 22 is preferably a small horse power gasoline engine. It is mounted on a suitable plate on the top of the water storage tank 15 and connected by conventional V-belts and pulleys to the oil and water pumps 19 and 21, respectively. The engine is provided with the usual fuel tank 83 and with a starting pulley 84.

The reservoir 23 is a small rectangular construction. It mounts the oil pump 19 on one side thereof (see Fig. 3) and is adjustably supported on rails 23.1 (see Fig. 2) on top of the water tank 15 so as to keep the proper tension on the belt which connects the oil pump 19 with the engine 22.

The throttle of the engine 22 is connected by a cable 86 (see Fig. 5) to a bell crank lever 87 pivoted adjacent the bar 31 so that a shoulder 88 on said bar 31 will engage the lever 87 when the bar 31 reaches its fully retracted position and shift the engine throttle to idle the engine 22, since, with the bar in its retracted position, the valve 71 is shifted to direct the flow of water from the pump 21 back to the tank 15.

The motor-lift truck 25, with which this improved vehicle washing machine is designed for use, is likewise conventional equipment. The arrangement of the platform 24 on a hydraulic lift 85 is normally used to insert the platform 24 under articles resting on and slightly elevate them above the floor for subsequent transport about and/or elevation some distance above the floor for transfer to another vehicle or on a stack of other similar objects. When this improved washing machine is in position on such a lift-truck platform 24, it may be conveyed to and about the vehicle to be washed and the brush and spray mechanism 16 may be raised and lowered (as well as shifted horizontally) to accommodate it to the character of the truck which is being washed.

The motor lift-truck 25 is provided with the usual control levers for its movement and for the raising and lowering of the platform 24.

The operation of the device herein shown is as follows:

The storage tank 15 is filled with water and the oil reservoir 25 supplied with the required quantity of oil. The operator, by means of the usual rope placed on the engine's starting pulley 84, starts the engine 22. Thereupon water is circulated by the pump 21 through the water supply line 70 and an oil pressure is built up in the pipes 65 leading to the master valve 20. Normally the master valve 20 is left so that the bar 31 is retracted.

Seated on the motor lift-truck 25 the operator transports the washing machine to the proximity of the vehicle to be washed.

As soon as the operator has brought the brush into the desired proximity of the vehicle he shifts the control handle 68 so as to operate the master valve 20 to release oil pressure from the cylinder-piston motor 18. This frees the piston to permit the spring 58 to advance the brush and spray means 16 toward the vehicle to be washed. The shift of the bar 31 frees the valve-operating lever 78 so as to open communication between the water supply line 70 and the branch 73, thus providing water to the spray pipes 33 to effect the desired washing of the car. A further movement of the operating handle 68 shifts the master valve 20 to admit oil under pressure to the motor 17, causing a rotation of the brush 29.

By control of the motor lift-truck 25, the operator moves the brush and spray means 16 along the side, and if desired around the front and the back of the vehicle being washed.

As the height of the vehicle being washed may require, the operator may operate the controls for the hydraulic lift 85 and raise or lower the brush and spray means 16.

By proper actuation of the handle 68 the operator may alter the horizontal position of the bar 31 so as to extend or retract the brush and spray means 16 with respect to the vehicle being washed, as the contour of that vehicle may require. If, perchance, there is some projection on the vehicle, such as a rear-view mirror, this retraction and subsequent extension of the brush and spray means 16 may be such as to avoid damaging either the brush or the projection on the vehicle being washed.

If the contour of the vehicle being washed is not perfectly vertical, the equalizers 36 will permit the brush to assume an incline to the vertical to accommodate itself to the unvertical contour of the vehicle being washed.

When the washing operation is completed, a shifting of the control handle 68 actuates the master valve 20 to successively cut off oil pressure to the motor 17 and apply it to the motor 18 to retract brush and spray means 16 with the resultant cut off of the flow of water to the spray pipes 33.

If, on occasion, it is necessary to use a brush for washing parts of the vehicle not reached by the brush and spray means 16, a hand brush 77 may be connected to the branch 74 and water supplied thereto through the operation of the valve 72.

Variations and modifications in the details of structure and arrangement of the parts may be resorted to within the spirit and coverage of the appended claims.

I claim:

1. A vehicle-washing machine of a type for convenient transport to and from a vehicle comprising a water storage tank, a bar reciprocatingly mounted on said tank, a vertically disposed brush rotatably mounted on the end of said bar, a water spray mounted adjacent said brush, an oil reservoir mounted on said tank, oil operated motors for reciprocating said bar and rotating said brush, an oil pump and a water pump mounted on said tank, said oil pump being connected to said reservoir and said oil motors, said water pump being connected to said tank and said water spray, a power unit mounted on said tank and connected to operate said pumps, a valve controlling the water flow from said water pump to said spray, an operating lever on said valve arranged adjacent said bar, a shoulder on said bar adapted to engage said lever, means normally urging said lever into the path of said shoulder, and valve means having a single manually-actuatable regulator arranged on said tank for controlling the oil flow from said oil pump to said oil motors for synchronizing the delivery of a water spray to said brush with the reciprocation of said bar, whereby water is delivered to said spray only when oil pressure is supplied to the motor for rotating said brush.

2. A vehicle-washing machine of a type for convenient transport to and from a vehicle comprising a water storage tank, a bar reciprocatingly mounted on said tank, a vertically disposed brush rotatably mounted on the end of said bar, a water spray mounted adjacent said brush, an oil reservoir mounted on said tank, oil operated motors for reciprocating said bar and rotating said brush, an oil pump and a water pump mounted on said tank, said oil pump being connected to said reservoir and to said oil motors, said water pump being connected to said tank and said water spray, a power unit mounted on said tank and connected to operate said pumps, a valve controlling the water flow from said water pump to said spray, an operating lever on said valve arranged adjacent said bar, a shoulder on said bar adapted to engage said lever, means normally urging said lever into the path of said shoulder, valve means having a single manually-actuatable regulator arranged on said tank for controlling the oil flow from said oil pump to said oil motors for synchronizing the delivery of a water spray to said brush with the reciprocation of said bar, whereby water is delivered to the spray only when fluid pressure is supplied to the motor for rotating said brush and a motor vehicle having a forwardly extending elevatable platform supporting said tank whereby said brush is movable toward and away from and vertically of the vehicle to be washed.

3. A vehicle-washing machine of a type for convenient transport to and from a vehicle comprising a water storage tank, a bar reciprocatingly mounted on said tank, a vertically disposed yoke mounted on said bar, a brush rotatably journaled on said yoke, a water spray mounted on said tank adjacent said brush, a fluid motor connected to actuate said bar, a fluid motor connected to rotate said brush, a fluid pump mounted on said tank and connected to both of said fluid motors, a water pump mounted on said tank and connected to said water spray, a power generating unit mounted on said tank and connected to operate said pumps, valve means having a single manually-actuatable regulator arranged on said tank for controlling the fluid flow from said fluid pump to said motors and the water flow from said water pump to said spray, and a motor vehicle having a forwardly extending elevatable platform supporting said tank whereby said brush is movable toward and away from and vertically of the vehicle to be washed.

4. A vehicle-washing machine of a type for convenient transport to and from a vehicle comprising a motor vehicle having an elevatable lift platform arranged thereon, a water storage tank mounted on said platform, a vertically disposed brush rotatably supported on said tank, a water spray mounted adjacent said brush, a fluid motor connected to rotate said brush, a fluid pump and a water pump mounted on said tank and respectively connected to said motor and said spray, a power generating unit mounted on said tank and connected to operate said pumps, and valve means having a single manually-actuatable regulator on said tank for controlling the fluid flow from said fluid pump to said fluid motor and the water flow from said water pump to said spray, whereby water is delivered to said spray only when said brush is rotating.

5. A vehicle-washing machine of a type for convenient transport to and from a vehicle comprising a water storage tank, a bar reciprocatingly mounted on said tank, a vertically disposed yoke mounted on said bar, a brush rotatably mounted on said yoke, a water spray mounted adjacent said brush, a fluid motor connected to actuate said bar, a fluid motor connected to rotate said brush, a fluid pump mounted on said tank and connected to said fluid motors, a water pump mounted on said tank and connecting said tank to said water spray, a gasoline engine mounted on said tank and connected to operate said pumps, valve means having a single manually-actuatable regulator arranged on said tank for controlling the fluid flow from said fluid pump to said motors, other valve means actuated by the reciprocation of said bar for controlling the water flow from said water pump to said spray, and a lever connected to the throttle of said engine and positioned on said tank to be engaged by said bar to shift said throttle to idle said engine when said bar is in its retracted position.

6. A vehicle washing machine of a type for convenient transport to and from a vehicle comprising, a water storage tank, a bar reciprocatingly mounted on said tank, a vertically disposed yoke mounted on said bar, a brush journaled on said yoke for rotation about a vertical axis, a water spray mounted adjacent said brush, a fluid motor connected to actuate said bar for disposing the brush in effective relationship with the vehicle to be washed, a fluid motor connected to rotate said brush, a fluid pump mounted on said tank and connected to both of said fluid motors, a water pump mounted on said tank and connected to convey water from said tank to said water spray, a power generating unit mounted on said tank and connected to operate said pumps, valve means having a single manually-actuatable regulator arranged on said tank for controlling the fluid flow from said fluid pump to said fluid motors, and other valve means actuated by the reciprocation of said bar for controlling the water flow from said pump to said spray, whereby water is supplied to said spray only when fluid pressure is supplied to said fluid motors.

7. A vehicle washing machine of a type for convenient transport to and from a vehicle comprising, a water storage tank, a bar reciprocatingly mounted on said tank, a vertically disposed yoke connected to said bar, a brush journaled on said yoke for rotation about a vertical axis, a water spray mounted adjacent said brush, a spring connected to normally shift said bar to dispose said brush in horizontally extended relationship for disposing the brush in effective relationship with the vehicle to be washed, a fluid-actuated piston connected to retract said bar against the action of said spring, a fluid motor connected to rotate said brush, a fluid pump mounted on said tank and connected to said motor and said piston, a water pump mounted on said tank and connected to convey water from said tank to said spray, a power generating unit mounted on said tank and connected to operate said pumps, valve means having a single manually-actuatable regulator arranged on said tank for respectively controlling the fluid flow from said fluid pump to said motor and to said piston for respectively effecting the rotation and the horizontal positioning of said brush, and other means actuated by the horizontal positioning of said brush for controlling the water flow to said spray, whereby water is supplied to said brush only when it is in its extended washing position.

8. A vehicle washing machine of a type for convenient transport to and from a vehicle comprising, a water storage tank, a frame on said tank mounting pairs of horizontally-spaced rollers, an I-bar interposed between said pairs of rollers for horizontal reciprocation, a vertically disposed yoke mounted on the outer end of said bar, a brush journaled on said yoke for rotation about a vertical axis, a water spray mounted adjacent said brush, a fluid motor connected to rotate said brush, a spring interposed between said tank and said bar and normally urging said bar to dispose said brush in horizontally-extended relationship with respect to said tank for disposing the brush in effective relationship with the vehicle to be washed, a fluid actuated piston mounted on said frame and connected to retract said bar against the action of said spring, a fluid pump and a water pump mounted on said tank, said fluid pump being connected to respectively operate said brush motor and said piston and said water pump being connected to convey water from said tank to said spray, a power generating unit mounted on said tank and connected to operate said pumps, valve means having a single manually-actuatable regulator arranged on said tank for controlling the fluid flow from said fluid pump to said fluid motor and said piston for respectively effecting the rotation and the horizontal positioning of said brush, and other valve means actuated by the horizontal positioning of said brush for controlling the water flow to said spray, whereby water is supplied to said brush only when it is in its extended washing position.

MARVIN J. WILSON.

References Cited in the file of this patent

UNITED STATES PATENTS

| Number | Name | Date |
|---|---|---|
| 518,322 | La Casse | Apr. 17, 1894 |
| 1,411,321 | Wright | Apr. 4, 1922 |
| 1,411,949 | Wilson | Apr. 4, 1922 |
| 1,593,976 | Kelvis | July 27, 1926 |
| 1,666,170 | Fitzpatrick | Apr. 17, 1928 |
| 1,823,222 | Whitsitt | Sept. 15, 1931 |
| 1,925,759 | Huntington | Sept. 5, 1933 |
| 2,215,692 | Fleming | Sept. 24, 1940 |
| 2,242,692 | Yingling | May 20, 1941 |
| 2,253,609 | Byron et al. | Aug. 26, 1941 |
| 2,508,452 | Dwyer | May 23, 1950 |
| 2,530,720 | Paulson | Nov. 21, 1950 |
| 2,559,295 | Grossenbacher | July 3, 1951 |